(12) United States Patent
Andersen

(10) Patent No.: US 6,301,832 B1
(45) Date of Patent: Oct. 16, 2001

(54) CHILD SAFETY BARRIER

(76) Inventor: Finn Andersen, Niels Bohrsvej 14, DK-8670 Lasby (DK)

( * ) Notice: Subject to any disclaimer, the term of this patent is extended or adjusted under 35 U.S.C. 154(b) by 0 days.

(21) Appl. No.: 09/658,944

(22) Filed: Sep. 11, 2000

Related U.S. Application Data

(63) Continuation of application No. 09/171,653, filed as application No. PCT/DK97/00190 on Apr. 24, 1997.

(30) Foreign Application Priority Data

Apr. 24, 1996 (DM) .......................................... 0494

(51) Int. Cl.⁷ ........................................................ E06B 3/68
(52) U.S. Cl. .................................................................. 49/57
(58) Field of Search ................................... 49/50, 55, 57, 49/463, 465

(56) References Cited

U.S. PATENT DOCUMENTS

| | | | | |
|---|---|---|---|---|
| 4,611,431 | * | 9/1986 | Lauro | 49/57 X |
| 5,117,585 | * | 6/1992 | Andrisin | 49/57 X |
| 5,251,851 | * | 10/1993 | Herrmann et al. | 244/129.5 |
| 5,396,732 | * | 3/1995 | Andersen | 49/57 X |

* cited by examiner

*Primary Examiner*—Jerry Redman
(74) *Attorney, Agent, or Firm*—Dykema Gossett PLLC

(57) ABSTRACT

A child safety barrier for positioning across an opening includes a frame and a gate which is hinged to the frame and can be swung from a closed position where the gate lies in the plane of the frame to an open position out of the plane, a corner of the barrier including a spring-biased threaded rod with friction block which can be pressure fit against a side of the opening and includes markers for indicating the degree of pressure fit within the opening.

8 Claims, 2 Drawing Sheets

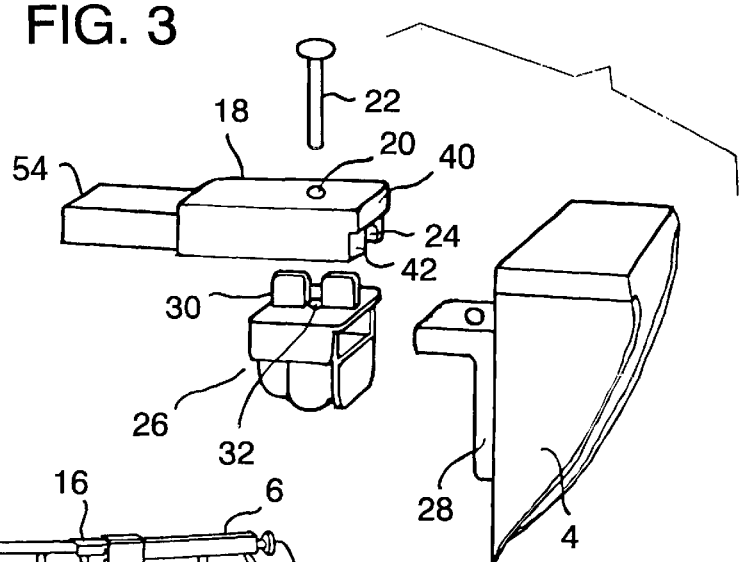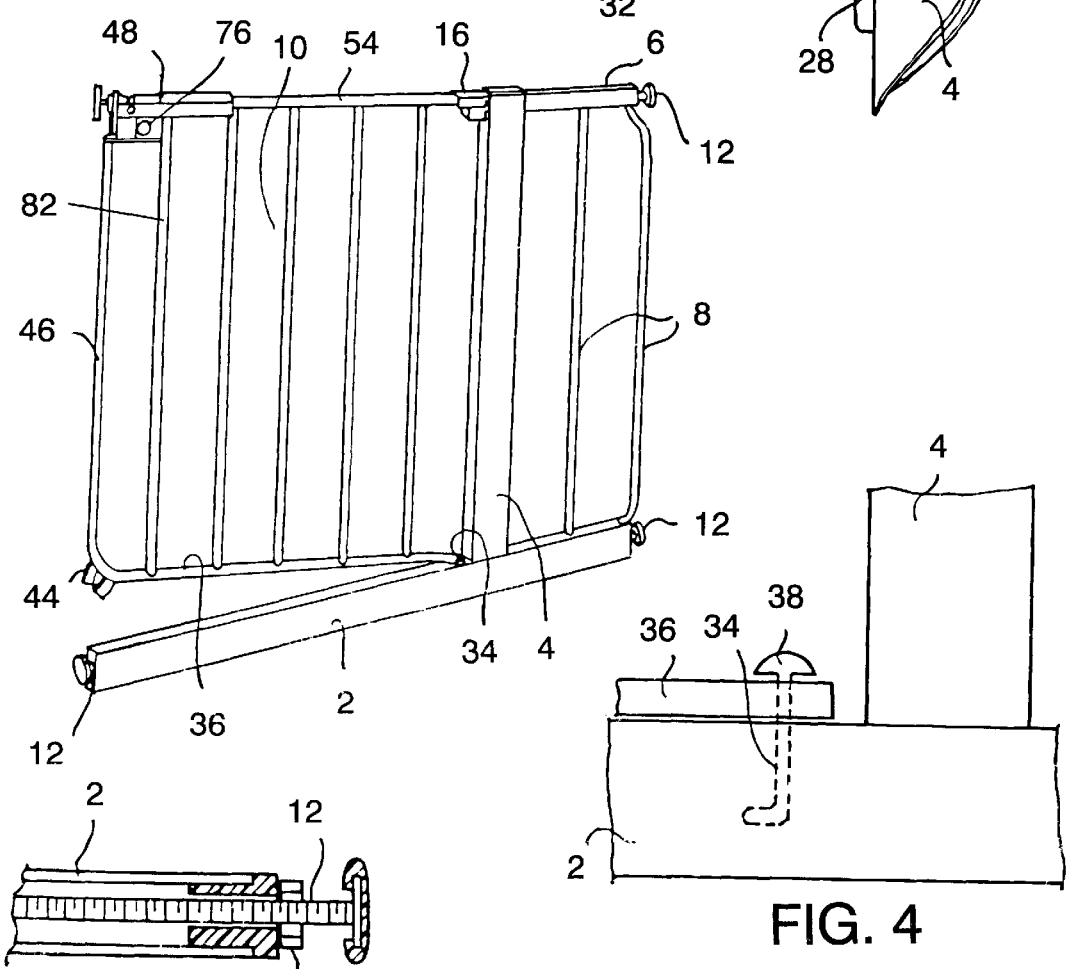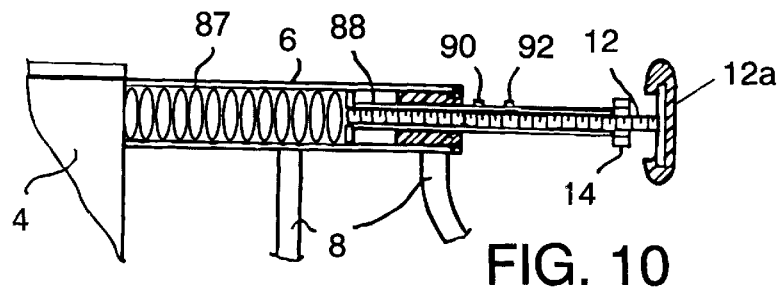

CHILD SAFETY BARRIER

CROSS REFERENCE TO RELATED APPLICATION

This is a continuation of application Ser. No. 09/171,653, filed Mar. 17, 1999, which was a U.S. national phase of PCT/DK97/00190, filed Apr. 24, 1997.

BACKGROUND AND SUMMARY OF THE INVENTION

The present invention relates to a safety child barrier of the type which includes a gate mounted in a frame, the barrier being fastenable in an opening using clamping devices which can be clamped against the sides of the opening.

Child safety gates are used as temporary barriers across doorways, stairways, windows, and similar openings to prevent small children and animals from passing therethrough.

There are known child safety barriers which include a frame with a central gate and there are also known barriers where the gate is located at one side thereof.

The purpose of this invention is to provide gates of enhanced reliability. The barrier has a special hinge construction which prevents buckling at the hinge, and the barrier has also a special closing mechanism having an extra protection against unintended opening. Finally, the barrier includes an indicator device to indicate the clamping in the opening.

BRIEF DESCRIPTION OF THE DRAWINGS

An embodiment of the invention shall be explained further below with reference to the enclosed drawings.

FIG. 1 is a perspective view of a child safety barrier constructed in accordance with a preferred embodiment of the present invention, the barrier including a frame and a gate hinged thereto, FIG. 2 is a view of one end of the base member of the frame and showing a closing mechanism for clamping against a side of an opening in which the barrier is positioned, FIG. 3 is a perspective view of a locking hinge between the upper end of the gate and vertical post of the frame, FIG. 4 is a view of a hinge between the lower end of the gate and the base member of the frame, FIG. 10 shows a pressure indicator unit in the upper rod of the frame.

DETAILED DESCRIPTION OF THE PREFERRED EMBODIMENT

Figure 5:
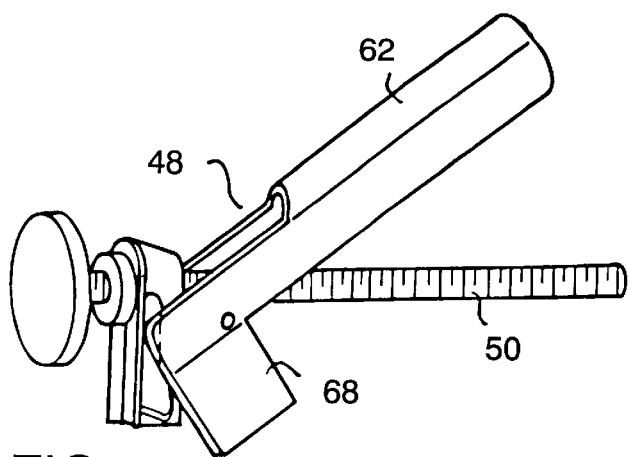
FIGS. 5, 5a, 6, 7 and 11 depict the closing mechanism at the free end of the upper rod of the gate.

The child safety barrier includes a frame having a base member 2 and an upright post member 4, a short upper rod member 6 extending to one side at the upper end of the post member. Vertical rods 8 extend between the upper rod member and the base member. On the other side of the post a gate 10 is hinged.

For fastening of the barrier in the opening there is in each corner of the plane of the barrier, i.e., in both ends of the base member 2 and the free end of the upper member 6 a threaded rod 12 with a friction block. The threaded rods can be pulled in and out and fixed by means of a counter nut 14 so that their length can be adjusted to the size of the actual opening.

The gate includes a closing mechanism 48 which also has a corresponding threaded bar with a friction block which can be pulled in and out and fixed with a counter nut, and which by means of the closing mechanism can be clamped against the opening.

At the top of the gate 10 is hinged to the post 4 by means of a specially designed hinge 16. As shown in FIG. 3, a substantially tube-shaped upper hinge part 18 of plastic with a hole 20 for a pivot pin 22 is mounted over the upper rod 54 of the gate. At this location the hinge part is solid. On the lower part of the hinge part there is a slot 24. The other hinge part 26 is attached to the post 4, on to which an angle 28 is welded. The hinge part has a pocket, by means of which this can be slipped in over the perpendicularly projecting flap of the angle on the post. On the upper part of the hinge part there is a fin 30 projecting upwards, which fits loosely up into the slot 24 on the other hinge part. There is also a through-going hole 32 for the pivot pin 22. The hole is carried through the angle so that the hinge part is fixed by means of the pivot pin 22. On the lower side of the hinge part the hole is continued in a tube section and at the back there is a contact surface facing the post or more precisely the angle. Furthermore, there is a reinforcing rib. The pivot pin 22 is attached by tight fitting or by screwing it into the upper part 18 of the hinge, and in the closed position of the gate the pivot is still hidden in the hinge, i.e., the pivot does not project beneath the hinge.

As shown in FIG. 4, at its bottom the gate is hinged to the base member by means of a pivot pin 34 situated through a hole in the bottom rod 36 of the gate further down through a hole in the top side of the base member 2 of the frame. The end of the pivot pin 34 is bent to the side so that it functions as a stop for pulling up the gate. The pivot pin is inserted by manipulating it through the hole in the bottom rod of the gate and further down into the bottom rod of the frame. The pivot pin 34 can be welded to the gate by the head.

To open the barrier the gate is lifted by means of which the upper part of the hinge 16 is lifted clear of the fin 30 on the lower part 26. When the gate is swung open the upper part 18 will ride on the fin 30. The vertical lift of the gate is as mentioned limited by the pivot pin 34 in the bottom hinging of the gate. In the closed position of the gate the hinge is fixed against sideways deflection as the fin 30 here is situated in the slot 24 on the under side of the upper part 18 of the hinge. Furthermore, the forces appearing in the upper member of the gate will be transmitted directly to the vertical post 4, as the rear edge of the upper hinge part is at the top shaped as an planar contact plane 40 for contact against the pillar whereas the edge at the slot region is shaped as rounded sliding surfaces 42 situated within the contact plane. In the open position the contact plane 40 is lifted above the pillar 4 and by swinging up the gate, the sliding surface 42 will slide upon the pillar. Altogether, the upper part of the barrier will in closed position stand as a nearly rigid through-going connection including the upper rod the gate, the upper part of the pillar and the upper rod of the frame.

In closed position the front corner at the bottom of the gate is secured against deflection by means of an U-shaped element 44 gripping around the top side of the base member 2. By lifting the gate for its opening, the element 44 clears the base member. The element 44 is positioned on the rounding where the lower rod of the gate curves into the front rod 46, by means of which the wedge-shaped space next to the base member is blocked so that children cannot get their toes or fingers caught in the gate.

Figure 5A:
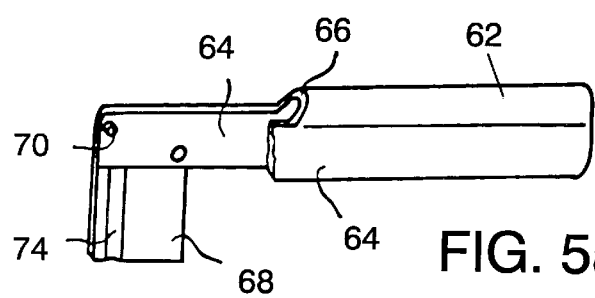
Figure 6:
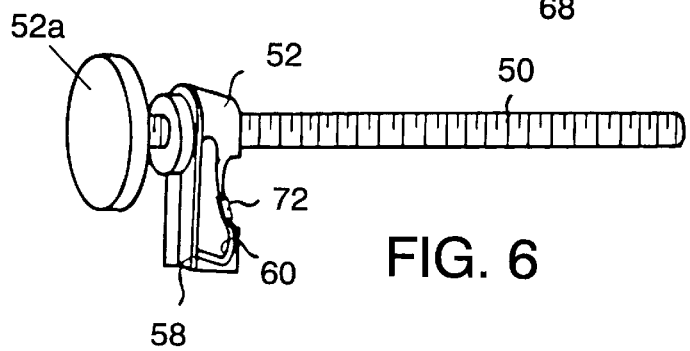
Figure 7:
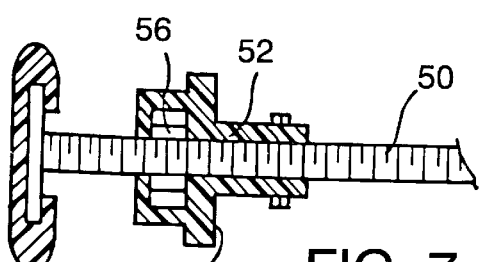

As seen in FIGS. 5–7, the gate includes a closing mechanism 48, which also has a threaded bar 50 with a friction block 50a. The threaded bar is situated in a through-going hole in a sliding element 52 and extends with its end into the upper rod 54. In the element 52 a nut 56 is cast so that the threaded bar can be screwed in and out to fit the actual size of an opening. At the front the element 52 has a sideways projecting cross wall 58, to which in each side a recess with a camface 60 is contigous. A handle 62 (see FIG. 5a) comprises two parallel sidewalls 64, which on the rear section is connected with a curved member 66 fitting the upper rod 54 of the gate. At the front the sidewalls have a side plate with a projection 70 cooperating with the camface 60 in the recess on the element 52. When the handle 62 is closed, i.e., in horizontal position, the threaded bar and thereby the friction block are in their projecting locked position. When opening the gate the handle is turned, thus causing the pins 70 in cooperation with the camface to pull back the threaded bar with the friction block out of contact with the opening, in which the barrier is placed. The gate can then be lifted and opened as described previously. When closing the gate the handle is pushed downwards, thus causing the front edge of the sides 64 to press against the cross wall 58 of the element by means of which this is pushed forward to clamp the friction block against the opening. On the edge of the element there is a projection 72 cooperating with a slot 74 in the side plates. In a closed position the projections are positioned in the slot. By lifting the handle to open the gate, the projections 72 will counteract this. Only with an extra firm grip on the handle it will be possible to swing it upwards as the sidewalls thereby are forced from each other and slide on top of the projections. On the other hand, the projections will cooperate in causing the handle to shut with a "snap effect" and to remain in the closed position.

Figure 11:
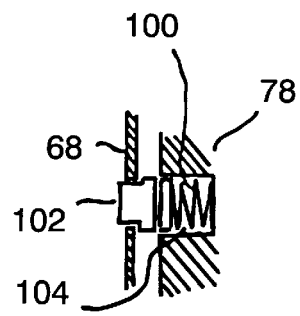
Figure 8:
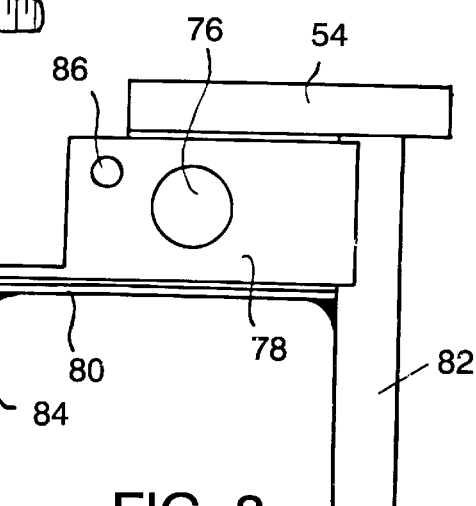
FIGS. 8–9 depict a blocking device located at the free end of the upper rod of the gate.
Figure 9:
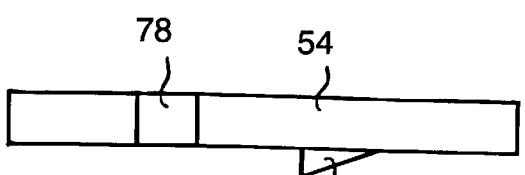

As an additional securing feature preventing opening of the gate, the handle is blocked by means of a spring-loaded blocking plastic block 78 (see FIGS. 8 and 9). This block is firmly fixed between a projecting end of the upper rod 54 of the gate and a parallel flat iron 80 welded to the front rod 46, which is a pipe, and the neighbour rod 82 of the gate. The rear edge of the block is undercut and grips around the rod 82. At the front the block is fixed by means of a pin 84 which projects downwardly into the pipe 46. The axis of rotation of the handle is embedded in a cross hole 86 in the block. The blocking knob 76 is designed as an entity with the plastic block and placed against the side plates 68 or designed as shown in FIG. 11 as a spring-loaded 100 loose knob 102 embedded in a recess 104 in the plastic block 78, and which grips into a hole in the side plate 68 of the handle. The handle is thus blocked in the closed position. In order to open the gate two independent movements are thus necessary, i.e., pushing into the blocking knob 76 as well as lifting the handle. Beyond this, the entire gate has to be lifted. The gate is hereby effectively secured against unintended opening, and at the same time it is still easy to open for an adult person. Besides being an integrated part of the plastic block, the blocking knob can of course also be shaped as a separate spring-loaded knob embedded in the plastic piece.

Due to the yielding of the opening where the barrier is placed, e.g., yielding banisters, it can be difficult to decide how hard the gate has to be clamped. For this purpose the upper rod of the frame is shaped as an indicator unit. As shown in FIG. 10, a spring 87 is positioned in rod 6 for affecting a pipe section 88 in which the threaded bar 12 with the friction block 12a is situated. On the pipe there are two indication marks 90,92, the first showing the sufficient clamping of the frame itself, the second showing sufficient clamping of the closing mechanism of the gate.

Figure 12:
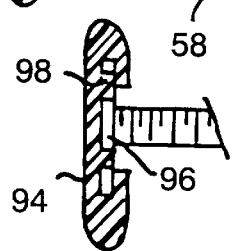
FIG. 12 shows a cross section of a free end of a threaded bar of the closing mechanism.

In order to improve the securing of the rubber or plastic coating (covering) 94 of the friction block on the supporting plate 96, this can be equipped with one or several holes 98, mainly three evenly distributed over the plate, and where the coating penetrates into the holes, cf. FIG. 12. The coating is thus effectively secured against stripping off by sideways forces on the gate. This applies by loosely fixed coating as well as vulcanized coating.

What is claimed is:

1. A child safety barrier which is positionable in an opening between two supports, said barrier comprising:
    a frame to be clamped between the two supports, the frame including a lower horizontally-extending base member, a vertical pillar attached thereto and a side rod attached to one side of the pillar at the top thereof, and said frame defining an imaginary plane,
    an openable gate which is connected to said frame and is pivotable relative thereto between an open and a closed position, said gate including an upper rod having an expandable closing mechanism for clamping against one of the supports for locking the gate in its closed position, and wherein a corner of the barrier by means of which the barrier is to be clamped includes a pressure indicator.

2. A child safety barrier according to claim 1, wherein said pressure indicator is located in said side rod attached to the top of the pillar.

3. A child safety barrier according to claim 2, wherein said pressure indicator includes a spring located in the side rod.

4. A child safety barrier according to claim 1, wherein the pressure indicator comprises indicator marks indicating the clamping force of the gate in a closed position.

5. A child safety barrier according to claim 4, wherein the indicator marks comprise an indicator mark showing a sufficient clamping force of the gate in a closed position.

6. A child safety barrier according to claim 4, wherein the indicator marks comprise an indicator mark showing an insufficient clamping force of the gate in a closed position.

7. A child safety barrier according to claim 1, wherein the pressure indicator comprises a spring for indicating the clamping force of the gate in a closed position.

8. A child safety barrier according to claim 7, wherein the pressure indicator further comprises a pipe section in which one end of a threaded rod is situated and the other end of the threaded rod includes a friction pad for engagement with one of the two opposed supports.

* * * * *